US011650372B2

(12) United States Patent
Schreiber et al.

(10) Patent No.: US 11,650,372 B2
(45) Date of Patent: May 16, 2023

(54) OPTICAL COUPLING DEVICE HAVING DIFFRACTION GRATINGS FOR COUPLING LIGHT WITH A LIGHT GUIDE AND FABRICATION METHOD THEREOF

(71) Applicant: CORNING INCORPORATED, Corning, NY (US)

(72) Inventors: Horst Herbert Anton Schreiber, Livonia, NY (US); Bin Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/408,692

(22) Filed: Aug. 23, 2021

(65) Prior Publication Data
US 2022/0091340 A1 Mar. 24, 2022

Related U.S. Application Data

(60) Provisional application No. 63/081,004, filed on Sep. 21, 2020.

(51) Int. Cl.
*G02B 6/34* (2006.01)
(52) U.S. Cl.
CPC ..................... *G02B 6/34* (2013.01)
(58) Field of Classification Search
CPC .................. G02B 6/34; G02B 5/1871
See application file for complete search history.

(56) References Cited

U.S. PATENT DOCUMENTS

| | | | |
|---|---|---|---|
| 10,845,538 B2* | 11/2020 | Shipton | G02B 27/4272 |
| 2010/0091369 A1* | 4/2010 | Hoose | G02B 5/1857 |
| | | | 359/576 |
| 2013/0032914 A1* | 2/2013 | Iwasaki | H01L 31/02327 |
| | | | 257/E31.127 |
| 2016/0327789 A1 | 11/2016 | Klug et al. | |
| 2017/0023711 A1* | 1/2017 | Jiang | G02B 5/1842 |

(Continued)

FOREIGN PATENT DOCUMENTS

| | | |
|---|---|---|
| AU | 2016258618 A1 | 10/2017 |
| AU | 2017362910 A1 | 6/2019 |

(Continued)

OTHER PUBLICATIONS

Gleiter, "Nanoglasses: a new kind of noncrystalline materials", Beilstein Journal of Nanotechnology, vol. 4, 2013, pp. 517-533.

(Continued)

*Primary Examiner* — Ellen E Kim
(74) *Attorney, Agent, or Firm* — Amy T. Lang (57) ABSTRACT

An optical coupler device for coupling light with a light guide is provided. The device includes a first layer having a plurality of first diffraction gratings spaced apart via first trenches, the first diffraction gratings and the first trenches forming first periodic units. The device also includes a second layer having a plurality of second diffraction gratings spaced apart via second trenches, the second diffraction gratings and the second trenches forming second periodic units. Additionally, the second periodic units are offset in a lateral axis of the optical coupler device relative to the first periodic units by a relative shift distance S2 that is in a range from about 10 nm to about 600 nm.

18 Claims, 5 Drawing Sheets

(56) References Cited

U.S. PATENT DOCUMENTS

| | | | |
|---|---|---|---|
| 2017/0038593 A1* | 2/2017 | Travers | G02B 27/01 |
| 2018/0052048 A1* | 2/2018 | Roh | G01J 3/0256 |
| 2018/0143438 A1* | 5/2018 | Oh | G02B 27/0081 |
| 2018/0143470 A1 | 5/2018 | Oh et al. | |
| 2018/0186689 A1 | 7/2018 | Melli et al. | |
| 2018/0274977 A1* | 9/2018 | Baik | G01J 3/18 |
| 2018/0306952 A1* | 10/2018 | Marutani | G02B 5/1866 |
| 2019/0025632 A1* | 1/2019 | Kuo | G02B 27/44 |
| 2019/0187474 A1 | 6/2019 | Bhargava et al. | |
| 2019/0235142 A1 | 8/2019 | Meyer Timmerman Thijssen et al. | |

FOREIGN PATENT DOCUMENTS

| | | | |
|---|---|---|---|
| AU | 2017363081 A1 | 6/2019 | |
| CA | 2981107 A1 | 11/2016 | |
| CA | 3044242 A1 | 5/2018 | |
| CA | 3044436 A1 | 5/2018 | |
| CN | 107533166 A | 1/2018 | |
| CN | 110178077 A | 8/2019 | |
| EP | 3292431 A1 | 3/2018 | |
| EP | 3542214 A1 | 9/2019 | |
| EP | 3542216 A1 | 9/2019 | |
| FI | 20176156 A1 | 6/2019 | |
| FI | 20176157 A1 | 6/2019 | |
| FI | 128028 B | 8/2019 | |
| JP | 2018-524621 A | 8/2018 | |
| KR | 10-2018-0004203 A | 1/2018 | |
| KR | 10-2019-0084099 A | 7/2019 | |
| KR | 10-2019-0084107 A | 7/2019 | |
| KR | 10-2019-0101436 A | 8/2019 | |
| WO | 2016/179246 A1 | 11/2016 | |
| WO | 2018/093730 A1 | 5/2018 | |
| WO | 2018/094096 A1 | 5/2018 | |
| WO | 2018/129151 A1 | 7/2018 | |
| WO | 2019/118930 A1 | 6/2019 | |
| WO | 2019/122528 A1 | 6/2019 | |
| WO | 2019/122529 A1 | 6/2019 | |
| WO | 2019/147315 A1 | 8/2019 | |

OTHER PUBLICATIONS

Wang et al., "Compact slanted grating couplers", Optics Express, vol. 12, Issue 15, 2004, pp. 3313-3326.

Wang et al., "Stratified waveguide grating couplers for normal fiber incidence", Optics Letters, vol. 30, Issue 8, 2005, pp. 845-847.

* cited by examiner

OPTICAL COUPLING DEVICE HAVING DIFFRACTION GRATINGS FOR COUPLING LIGHT WITH A LIGHT GUIDE AND FABRICATION METHOD THEREOF

This application claims priority under 35 USC § 119(e) from U.S. Provisional Patent Application Ser. No. 63/081,004 filed on Sep. 21, 2020 which is incorporated by reference herein in its entirety.

FIELD OF THE DISCLOSURE

The present disclosure generally relates to optical devices, and more particularly relates to a diffraction grating structure for coupling input light into a light guide or output light from a light guide.

BACKGROUND OF THE DISCLOSURE

Optical coupling devices are commonly employed to couple light into or out of a light guide for various applications. For example, optical light guides may be employed for wearable display augmented reality (AR) devices, whereby a virtual image propagates inside the light guide under total internal reflection (TIR) multiple times and an image of the reality world is transmitted through the light guide so that the two images overlap when viewed with human eyes. In order to couple the virtual image into and out of the light guide, diffractive optical elements, such as deep slanted gratings, may be employed to concentrate light into a first order and provide high in coupling/out coupling efficiency. In such optical devices, larger slat angles are typically needed in order to obtain higher efficiency, however, deep slanted gratings generally introduce fabrication challenges. It would be desirable to provide a diffractive optical coupling device with high efficiency that is easy to manufacture.

SUMMARY OF THE DISCLOSURE

According to one embodiment of the disclosure, an optical coupler device for coupling light with a light guide is provided. The optical coupler device comprises a first layer comprising a plurality of first diffraction gratings spaced apart via first trenches, the first diffraction gratings and the first trenches forming first periodic units. Additionally, the optical coupler device comprises a second layer comprising a plurality of second diffraction gratings spaced apart via second trenches, the second diffraction gratings and the second trenches forming second periodic units. The second periodic units are offset in a lateral axis of the optical coupler device relative to the first periodic units by a relative shift distance S2 that is in a range from about 10 nm to about 600 nm.

According to another embodiment of the disclosure, an optical device is provided. The optical device comprises a light guide and an optical coupler device coupled to the light guide. The optical coupler device comprises a first layer comprising a plurality of first diffraction gratings spaced apart via first trenches, the first diffraction gratings and the first trenches forming first periodic units. Additionally, the optical coupler device comprises a second layer comprising a plurality of second diffraction gratings spaced apart via second trenches, the second diffraction gratings and the second trenches forming second periodic units. The second periodic units are offset in a lateral axis of the optical coupler device relative to the first periodic units by a relative shift distance S2 that is in a range from about 10 nm to about 600 nm.

According to yet a further embodiment of the disclosure, a method of fabricating an optical coupler device for coupling light with a light guide is provided. The method comprises fabricating a first layer of first diffraction gratings spaced apart via first trenches by applying a photoresist and mask on a first grating substrate and etching the first grating substrate to remove the photoresist to form the first trenches. The first diffraction gratings and the first trenches forming first periodic units. The method also comprises fabricating a second layer of second diffraction gratings spaced apart via second trenches by depositing a second grating substrate on top of the first layer and applying a photoresist and mask on the second grating substrate and etching the second grating substrate to remove the photoresist to form the second trenches. The second diffraction gratings and the second trenches forming second periodic units and the second periodic units are offset in a lateral axis of the optical coupler device relative to the first periodic units by a relative shift distance S2 that is in a range from about 10 nm to about 600 nm. Additionally, the method comprises applying the fill material to fill the second trenches between the second diffraction gratings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

The following detailed description represents embodiments that are intended to provide an overview or framework for understanding the nature and character of the claims. The accompanied drawings are included to provide a further understanding of the claims and constitute a part of the specification. The drawings illustrate various embodiments, and together with the descriptions serve to explain the principles and operations of these embodiments as claimed.

Figure 1:
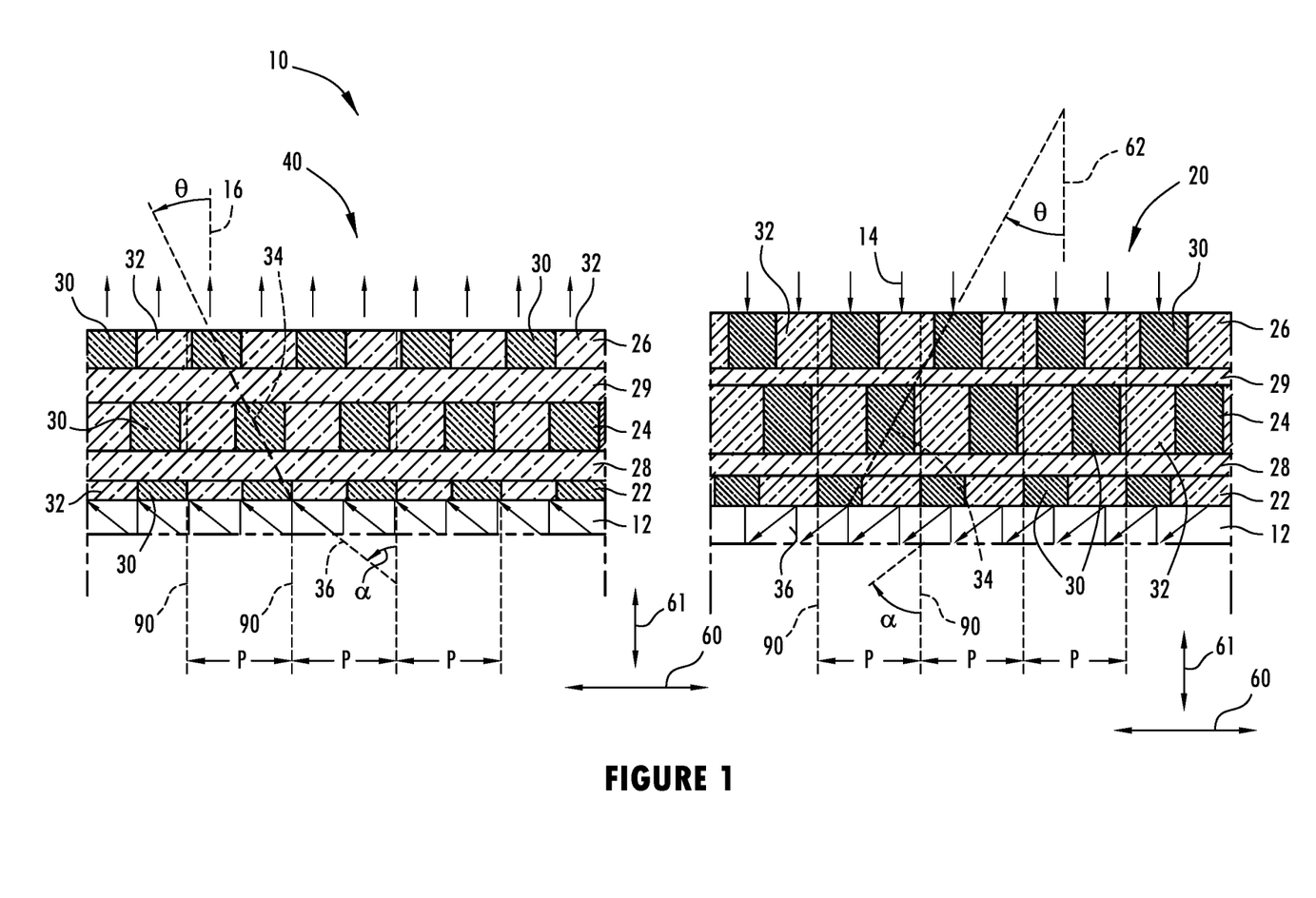
FIG. 1 is a schematic cross-sectional view of a portion of a light guide coupled to an input optical coupler device and an output optical coupler device, according to one example.

Referring now to FIG. 1, an optical device 10 is illustrated having a light guide 12 coupled to a first optical coupler device configured as an input coupler 20 and a second optical coupler device configured as an output coupler 40, according to one embodiment. The optical device 10 couples light into the light guide 12 and couples light out of the light guide 12 with the use of the respective input coupler 20 and output coupler 40. The optical device 10 may be used for various light transmission devices including, for example, wearable display augmented reality devices. For example, the optical device 10 may be used to propagate a virtual image inside the light guide 12 under total internal reflection (TIR) multiple times, while an image of the reality world may be transmitted through the light guide 12 such that the two images are overlapped in the eyes of a viewer. The input coupler 20 is used to couple light input 14, such as lighted images, into the light guide 12 where the light propagates, whereas the output coupler 40 is used to couple light output 16 from the light guide 12. In the example shown and described herein, the input coupler 20 and the output coupler 40 are fabricated on a surface of the light guide 12 and are shown located on a common surface on the same side of the light guide 12, according to one example. However, it should be appreciated that the input coupler 20 and the output coupler 40 may be located at other locations on the light guide 12 including surfaces on opposite sides of the light guide 12, according to other examples.

The input coupler 20 and the output coupler 40 are optical light coupling devices having binary grating coupler structures that provide high light coupling efficiency and offer efficient and economical fabrication. For example, the optical coupler devices may be fabricated using semiconductor mask technology as shown and described herein, according to one example.

Figure 2:
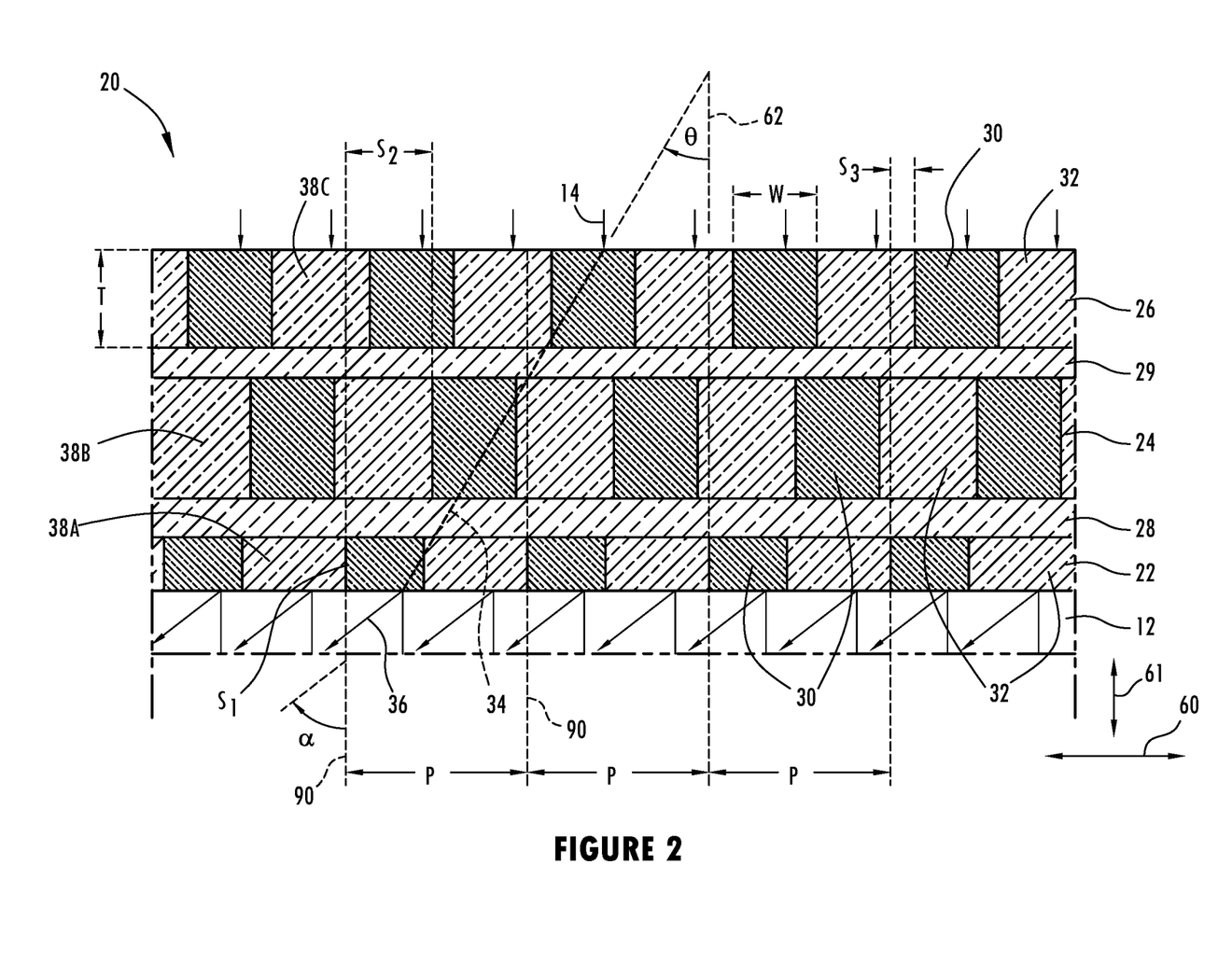
FIG. 2 is a cross-sectional view of an input optical coupler device, according to one example.
Figure 3:
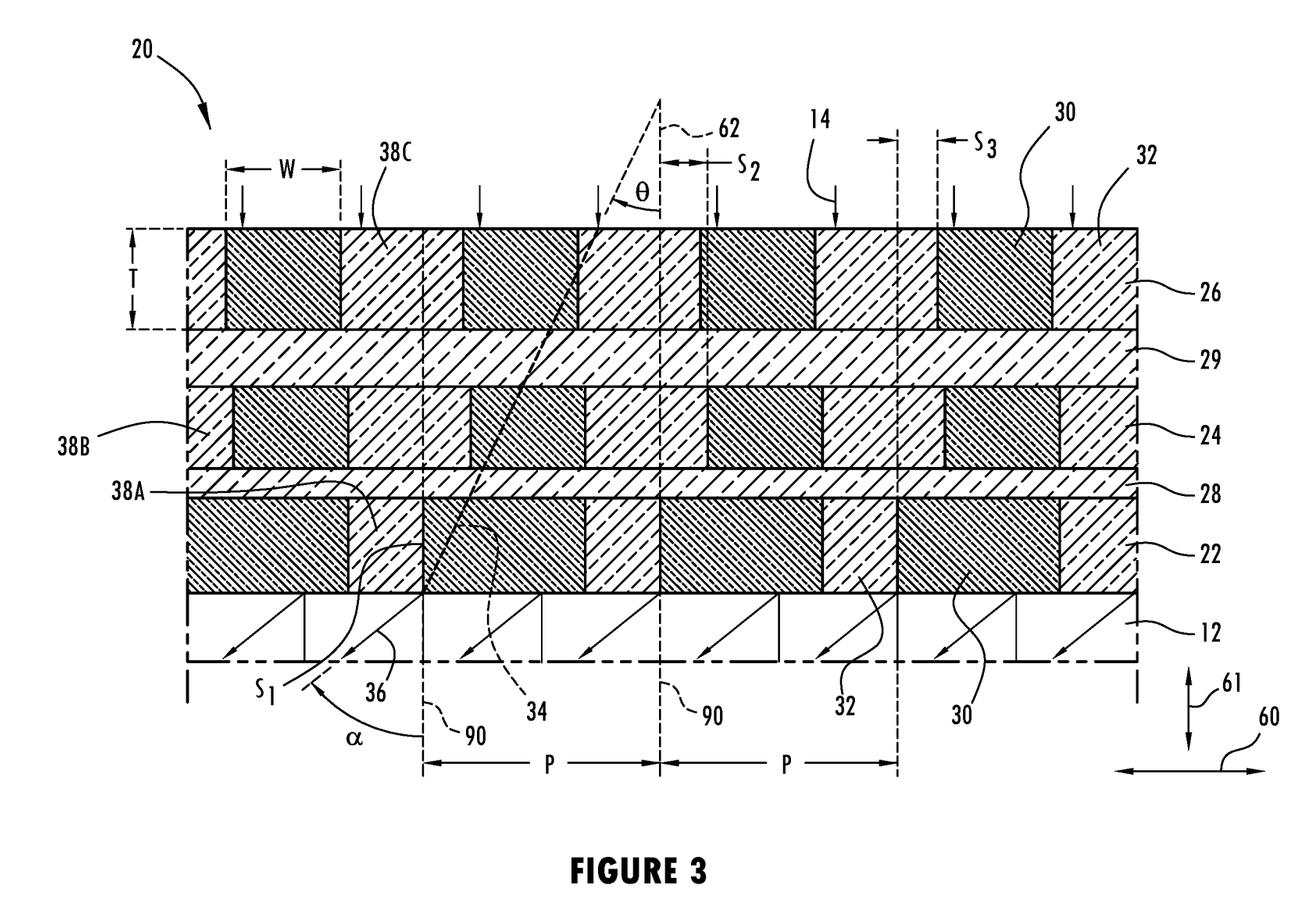
FIG. 3 is a cross-sectional view of an input optical coupler device, according to another example.

The input coupler 20 which is further illustrated in FIGS. 2 and 3, according to two exemplary embodiments, may be fabricated directly on a surface of the light guide 12 and is configured to couple light 14 into the light guide 12. The input coupler 20 includes a plurality of layers of binary diffraction gratings that form repeating units arranged in periodic units P along a lateral axis 60 of the input coupler 12. The repeating periodic units P are shown by dashed lines 90 such that the spacing of dashed lines 90 represents a pitch of the periodic units P. The plurality of layers includes a first layer 22 of first diffraction gratings 30 spaced apart via first trenches 38A such that the first diffraction gratings 30 define a first binary duty cycle within each periodic unit P. The plurality of layers also includes a second layer 24 of second diffraction gratings 30 spaced apart via second trenches 38B such that the second diffraction gratings 30 define a second binary duty cycle within each periodic unit P.

As also discussed further below, the second diffraction gratings 30 in the second layer 24 are offset in the lateral axis 60 relative to the first diffraction gratings 30 in the first layer 22 such that the first and second diffraction gratings 30 align so that a slanted line 34 at least partially intersects a grating 30 in each layer 22, 24. The slanted line 34 is oriented on a slanted angle θ relative to a vertical line 62 that is parallel with a vertical axis 61 of the input coupler 20.

A fill material 32 having a low refractive index is disposed within the first and second trenches 38A and 38B. In addition, a first layer 28 of fill material, such as in the form of a thin film, having a low refractive index is disposed between the first layer 22 and the second layer 24.

In the exemplary embodiments shown in FIGS. 2 and 3, the input coupler 20 further comprises a third layer 26 of third diffraction gratings 30 spaced apart via third trenches 38C such that the third diffraction gratings 30 define a third binary duty cycle within each periodic unit P. The third diffraction gratings 30 in the third layer 26 are offset in the lateral axis 60 relative to the first and second diffraction gratings 30 in the first and second layers 22 and 24 so that the first, second, and third diffraction gratings 30 align so that the slanted line 34 at least partially intersects a grating in each layer 22, 24, 26. In addition, a second layer 29 of fill material, such as in the form of a thin film, having a low refractive index is disposed between the second layer 24 and the third layer 26.

It should be appreciated that the input coupler 20 may include two or more layers of binary diffraction gratings, and more particularly three or more layers of diffraction gratings arranged in periodic units P along the lateral axis 60, wherein the diffraction gratings 30 in each layer are offset from the diffraction gratings 30 in other layers along the lateral axis 60 so that the slanted line 34 at least partially intersects a grating in each of the different layers.

FIG. 2 shows a first exemplary embodiment of input coupler 20 and FIG. 3 shows a second exemplary embodiment of input coupler 20, as discussed further below.

The input light 14 is coupled into the input coupler 20 at angle that is below the TIR angle of the light guide 12 (i.e., the angle whereby a virtual image propagates inside the light guide 12 under TIR). More specifically, the input light 14 is coupled into the input coupler 20 at angle that is between the normal incidence angle of the light guide 12 and the critical angle between the atmosphere outside of the input coupler 20 and the light guide 12. In some embodiments, the input light 14 is coupled to the input coupler 20 at an angle that is about 48 degrees or less, or about 42 degrees or less. It is also noted that the angle of the input light 14 is measured with regard to the vertical axis 61.

Figure 4:
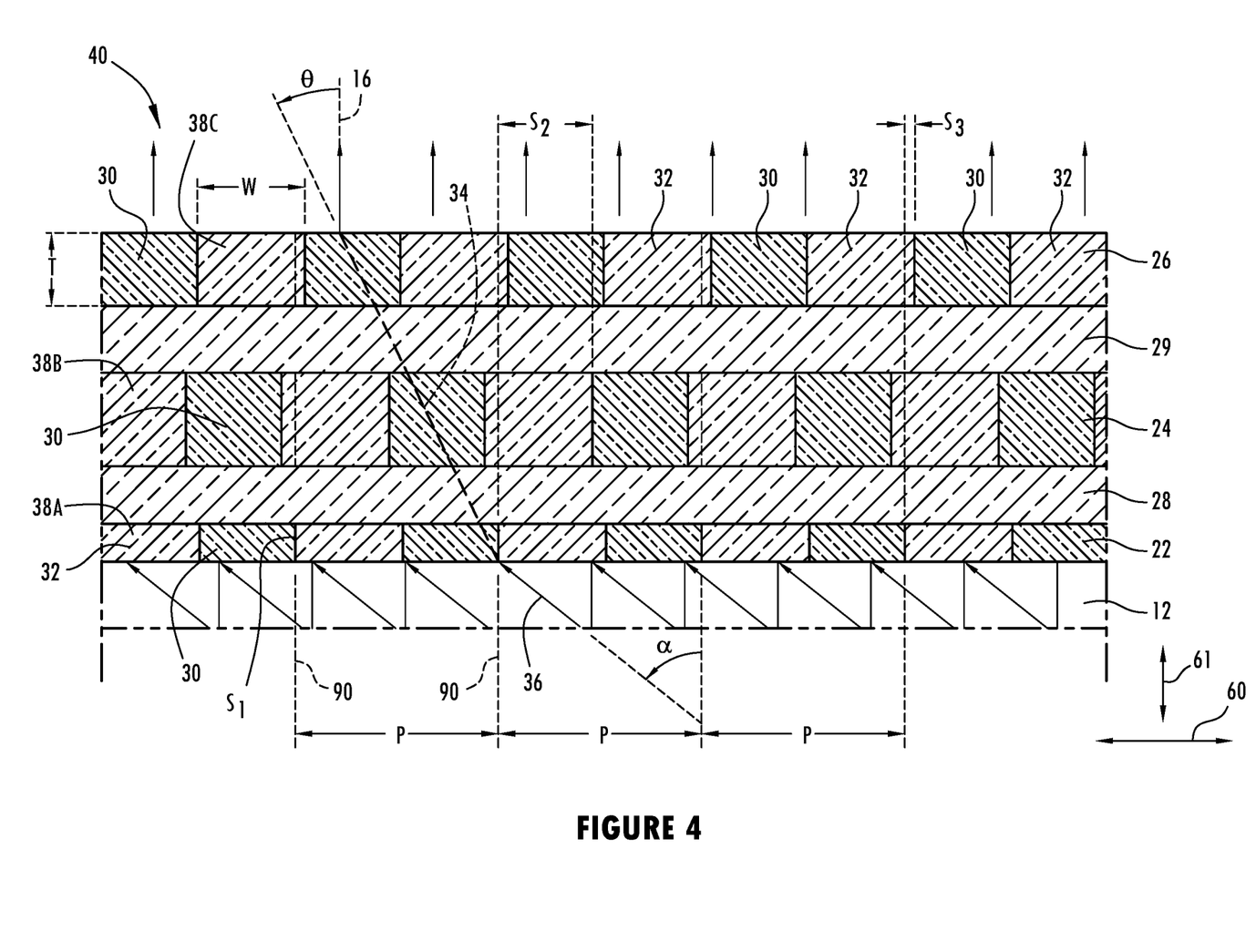
FIG. 4 is a cross-sectional view of an output optical coupler device, according to one example.

The output coupler 40, which is further illustrated in FIG. 4 according to an exemplary embodiment, is coupled to the light guide 12 and is configured for outputting light 16 from the light guide 12. The output coupler 40 may be fabricated directly on a surface of the light guide and is configured with a binary grating structure similar to the input coupler 20. The output coupler 40 includes a plurality of layers of binary diffraction gratings 30 that form repeating units arranged in periodic units P along the lateral axis 60. The repeating periodic units P are shown by dashed lines 90 such that the spacing of dashed lines 90 represents a pitch of the periodic units P. Similar to the input coupler 20, the plurality of layers of the output coupler 40 comprises a first layer 22 of first diffraction gratings 30 spaced apart via first trenches 38A such that the first diffraction gratings 30 define a first binary duty cycle within each periodic unit P. The plurality of layers of output coupler 40 also includes a second layer 24 of second diffraction gratings 30 that are spaced apart via second trenches 38B such that the second diffraction gratings 30 define a second binary duty cycle within each periodic unit P.

As also discussed further below, the second diffraction gratings 30 in the second layer 24 of the output coupler 40 are offset in the lateral axis 60 relative to the first diffraction gratings 30 in the first layer 22 of the output coupler 40 such that the first and second diffraction gratings 30 align so that a slanted line 34 at least partially intersects a grating 30 in each layer 22, 24. The slanted line 34 is oriented on a slanted angle θ relative to a vertical line (not shown in FIG. 4) that is parallel with the vertical axis 61 of the output coupler 40.

A fill material 32 having a low refractive index is disposed within the first and second trenches 38A and 38B. In addition, a first layer 28 of fill material such as in the form of a thin film having a low refractive index is disposed between the first and second layers 22 and 24.

In the example shown, the output coupler 40 further includes a third layer of diffraction gratings 30 spaced apart via third trenches 38C such that the diffraction gratings define a third binary duty cycle within each periodic unit P. The third diffraction gratings in the third layer 26 are offset in the lateral axis 60 relative to the diffraction gratings 30 of the first and second layers 22 and 24 so that the slanted line 34 at least partially intersects a grating in each layer 22, 24, and 26 and so that the light transmitted on the light guide 12 is efficiently coupled into the output coupler 40. The third trenches 38C within the third layer 26 of output coupler 40 are filled with the fill material 32. A second layer 29 of fill material such as in the form of a thin film having a low refractive index may be disposed between the second and third layers 24, 26 of output coupler.

It should be appreciated that the output coupler 40 may include two or more layers of binary diffraction gratings, and more particularly three or more layers of binary diffraction gratings arranged in periodic units P along the lateral axis 60, wherein the diffraction gratings in each layer are offset from diffraction gratings in the other layers along the lateral axis 60 so that the slanted line 34 at least partially intersects a grating in each of the different layers. Such produces very efficient light transmission of output coupler 40, such as greater than 99% efficiency.

Once the light is coupled into the input coupler 20 or the output coupler 40, the light is diffracted by the diffraction gratings 30 into multiple orders (e.g., first order, second order, third order etc.). It is noted that light in a first order is transmitted at a higher efficiency than light in a second, third, etc. order. Therefore, the material and dimensions of the diffraction gratings 30 of the present disclosure are optimized so that diffracted light of input coupler 20 and output coupler 40 is of the first order. The light is coupled out of the input coupler 20 and coupled into the input coupler at a propagation angle α, as discussed further below.

The optical couplers 20, 40 shown and described herein may each be configured to operate as either an input coupler or an output coupler. As discussed above, optical couplers 20, 40 are each formed, in the exemplary embodiments disclosed herein, as having three layers 22, 24, and 26 of binary diffraction gratings 30 that form repeating units arranged in periodic units P along the lateral axis 60. The diffraction gratings 30 in each of the three layers 22, 24 and 26 are offset in the lateral axis 60 relative to the diffraction gratings in the other layers such that the diffraction gratings in the various layers at least partially align on the slanted line 34, which forms slanted angle θ relative to vertical line 62. The slanted angle θ is the angle between the slanted line 34 and vertical line 62. Thus, the slanted angle θ is determined by slanted line 34 extending at least partially through a diffraction grating 30 in each of layers 22, 24 and 26. In some embodiments, slanted angle θ is in a range from about 5° to about 85°, or from about 10° to about 60°, or from about 20° to about 50°, or from about 20° to about 40°, or from about 20° to about 30° according to exemplary embodiments. In some embodiments, slanged angle θ is about 25° or about 26°.

The input light 14 entering the input coupler 20 and directed along the longitudinal axis 61 is diffracted by the diffraction gratings 30 in each of the multiple layers 22, 24, 26 such that the diffracted light travels along a light transmission path that is coupled into the light guide 12. Within the light guide 12, the light reflects repeatedly within the light guide 12 due to the total internal reflection in the light guide 12 and may exit the light guide 12 via the output coupler 40 where the light is diffracted by the diffraction gratings 30 that are aligned on the slanted line 34 extending at slanted angle θ through the various layers 22, 24, 26 such that the diffracted light travels along a transmission path and is output. The light guide 12 may have a critical angle for the total internal reflection (TIR) which may be in the range from about 30° to about 45° for glass having a refractive index in the range of 1.5 to 2.0.

The input and output couplers 20, 40 may each include, for example, two to twenty layers of diffraction gratings 30. Although FIGS. 2-4 show three layers of diffraction gratings 30, it is contemplated in other embodiments that input and output couplers 20, 40 may include, for example, two, four, six, nine, or ten layers of diffraction gratings 30. The layers of diffraction gratings 30 (e.g., layers 22, 24, 26) are formed on a surface of the light guide 12 and may be fabricated using semiconductor mask technology, as discussed further below.

The light guide 12 may be formed of a glass having a high refractive index such as about 1.5 or higher, or about 1.6 or higher, or about 1.7 or higher, or from about 1.5 to about 2.0, or from about 1.6 to about 2.0, or from about 1.7 to about 2.0. For example, the light guide 12 may comprise glass or glass-ceramic such as, for example, silicate glass, an aluminosilicate glass, alkali aluminosilicate glass, alkaline aluminosilicate glass, borosilicate glass, boro-aluminosilicate glass, alkali aluminoborosilicate glass, alkaline aluminoborosilicate glass, soda-lime glass, fused quartz (fused silica), or other type of glass. Exemplary glass materials include, but are not limited to, HPFS® fused silica sold by Corning Incorporated of Corning, N.Y. under glass codes 7980, 7979, and 8655, and EAGLE XG® boro-aluminosilicate glass also sold by Corning Incorporated of Corning, N.Y. Other glass substrates include, but are not limited to, Lotus NXT Glass, Iris Glass, WILLOW® Glass, GORILLA® Glass, VALOR® Glass, or PYREX® Glass sold by Corning Incorporated of Corning, N.Y. In other embodiments, light guide 12 may comprise one or more transparent polymers such as, for example, thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins. In other embodiments, light guide 12 may comprise a high index crystallization material comprising silicon carbide (SiC), zinc selenide (ZnSe), sapphire ($Al_2O_3$), and/or alumina.

The light guide 12 may also comprise one or more protective outer coatings on a surface thereof. The light guide 12 provides total internal reflection (TIR) such that light propagates multiple times within the light guide 12 as the light is transmitted through the light guide 12. The light guide 12 may have a thickness (as measured along the vertical axis 61) from about 0.3 mm to about 1.0 mm, or from about 0.5 mm to about 0.7 mm. In some embodiments, the thickness of the light guide 12 is about 100 times greater than the thickness of input coupler 20 and/or output coupler 40. For example, the thickness of couplers 20, 40 may each be in a range from about 1 micron to about 3 microns, or about 1.5 microns to about 2.5 microns.

The thickness T of each layer 22, 24, 26 of input and output couplers 20, 40 is in a range from about 100 nm to about 700 nm, or from about 200 nm to about 500 nm. In some embodiments, the thickness T of each layer 22, 24, 26 is about 115 nm, or about 220 nm, or about 290 nm, or about 340 nm, or about 400 nm, or about 500 nm, or about 550 nm. Each of the first, second, and third layers 22, 24, 26 may have a different thickness T from the other layers. However, it is also contemplated that one or more layers 22, 24, 26 may have the same (or approximately the same) thickness T as one or more other layers.

First and second fill layers 28, 29 may each have a thickness in a range from about 80 nm to about 300 nm, or from about 100 nm to about 260 nm, or from about 110 nm to about 240 nm. In some embodiments, the thickness of fill layers 28, 29 is about 105 nm, or about 115 nm, or about 120 nm, or about 160 nm, or about 200 nm, or about 220 nm. Fill layers 28, 29 may have the same or different thickness from each other. It is also contemplated in some embodiments, that couplers 20, 40 do not include first fill layer 28 and/or second fill layer 29.

Each layer of diffraction gratings 30 has a width W (as measured along the lateral axis 60). The width W of diffraction gratings 30 may range from about 100 nm to about 300 nm, or about 150 nm to about 250 nm, or about 180 nm to about 200 nm. In some embodiments, the width W of diffraction gratings 30 is about 180 nm, or about 190 nm, or about 200 nm, or about 210 nm, or about 280 nm. In some embodiments, the width W of diffraction gratings 30 in first layer 22 may be less than the width W of diffraction gratings 30 in either second layer 24 or third layer 26. Furthermore, the width W of diffraction gratings 30 in second layer 24 may be less than the width W of diffraction gratings 30 in third layer 26. It is also contemplated that the width W of diffraction gratings 30 in second layer 24 are substantially equal to the width W of diffraction gratings 20 in third layer 26. In other embodiments, the width W of the diffraction gratings 30 in each layer 22, 24, 26 are different from the other layers.

As shown in FIGS. 2-4, the width W of the diffraction gratings 30 in a single layer (e.g., 22, 24, or 26) may be the same as the other diffraction gratings in that same layer. However, it is also contemplated that one or more diffraction gratings 30 in a single layer may have a different thickness from one or more other diffraction gratings 30 in that same layer.

First, second, and third trenches 38A, 38B, 38C may each have a width in a range from about 100 nm to about 400 nm, or about 150 nm to about 350 nm, or about 200 nm to about 300 nm. In some embodiments, the width W of the trenches is about 120 nm, or about 210 nm, or about 220 nm, or about 230 nm, or about 260 nm. Furthermore, the width of first, second, and third trenches 38A, 38B, 38C may be the same or different from each other.

Input coupler 20 and/or output coupler 40 may have a total width (as measured along the lateral axis 60) in a range from about 50 mm to about 300 mm, or from about 100 mm to about 200 mm.

As discussed above, the diffraction gratings 30 and trenches 38A, 38B, 38C in each layer 22, 24, 26 form repeating periodic units P. Thus, for example, a first diffraction grating 30 and a first trench 38A in first layer 22 form a first periodic unit P, which is repeated along the length of first layer 22. A second diffraction grating 30 and a second trench 38B in second layer 24 form a second periodic unit P, which is repeated along the length of second layer 24. A third diffraction grating 30 and a third trench 38C in third layer 26 form a third periodic unit P, which is repeated along the length of third layer 26. Furthermore, the repeating periodic units P in the first, second, and third layers 22, 24, 26 are shifted and offset relative to each other.

With reference to FIG. 2, the periodic units P in second layer 24 are shifted relative to the periodic units P in first layer 22. For example, the dashed line 90 at S1 marks the beginning of a periodic unit P in first layer 22. However, the periodic units P in second layer 24 do not align with this dashed line 90. Instead, the periodic units P in second layer 24 are offset from the dashed line 90. More specifically, the periodic units P in second layer 24 are offset from dashed line 90 by a relative shift distance S2. Therefore, the periodic units P in second layer 24 are offset from the periodic units in first layer 22 by the relative shift distance S2.

The relative shift distance S2 may be in a range from about 10 nm to about 600 nm, or from about 50 nm to about 500 nm, or about 100 nm to about 400 nm. In some embodiments, the relative shift distance S2 is about 15 nm, or about 80 nm, or about 210 nm.

The periodic units P in third layer 26 are also shifted relative to the periodic units P in first layer 22. As discussed above, the dashed line 90 at S1 marks the beginning of a periodic unit P in first layer 22. However, the periodic units P in third layer 26 do not align with dashed line 90. Instead, the period units P in third layer 26 are offset from the dashed line 90 by a relative shift distance S3. Therefore, the periodic units P in third layer 26 are offset from the periodic units P in first layer 22 by the relative shift distance S3.

The relative shift distance S3 may be in a range from about 10 nm to about 600 nm, or from about 50 nm to about 500 nm, or from about 100 nm to about 400 nm. In some embodiments, the relative shift distance S3 is about 50 nm, or about 65 nm, or about 200 nm.

It is also noted that, in some embodiments, the relative shift distance S2 may be equal to the relative shift distance S3. Therefore, the periodic units P in second layer 24 and third layer 26 may be axially aligned along lateral axis 60 and may be shifted the same amount from the periodic units P of first layer 22. It is also contemplated that, in some embodiments, the periodic units P in second layer 24 and/or third layer 26 may not be shifted from the periodic units P in first layer 22.

The width of each periodic unit P in first, second, and third layers 22, 24, 26 (as measured along the lateral axis 60) may be in a range from about 200 nm to about 600 nm, or from about 300 nm to about 500 nm. In some embodiments, the width of each periodic unit P is about 400 nm or about 440 nm. It is also noted that the width of each periodic P is dependent on the width of the diffraction gratings 30 and the trenches 38A, 28B, 38C. Therefore, for example, the width of the periodic units P of first layer 22 may be the same as the width of the periodic units P of second layer 24 even though the width of the diffraction gratings 30 of first layer 22 are smaller than the width of the diffracting gratings 30 of second layer 24. In some embodiments, the widths of the period units P in first, second, and third layers 22, 24, 26 are all equal.

As discussed further with the exemplary examples provided below, FIG. 2 discloses a second embodiment of an input coupler 20 having periodic units P with different widths than those of FIG. 1.

The relative shift distances S2 and S3 of second and third layers 24, 26 (as compared to S1 of first layer 22) determine the angle of slanted line 34 and thus the slanted angle θ, which in turn determines the angle that light is transmitted through the optical couplers 22, 40. Thus, the relative shift distances S2 and S3 of second and third layers 24, 26 (as compared to S1 of first layer 22) determines the propagation angle α at which the light propagates within the coupler 20, 40.

In some embodiments, the propagation angle α is between the critical angle of the light guide 12 and 90 degrees. For example, the propagation angle α may be in a range from about 30° to about 90°, or from about 40° to about 80°, or from about 50° to about 60°. In some embodiments, the propagation angle α is about 50°, or about 51°, or about 52°.

The slanted angle θ, in some embodiments, is approximately equal to one-half of the propagation angle α.

The propagation of the light through input coupler 20 and/or output coupler 40 can be controlled by the pitch of the period units P of each layer 22, 24, 26. If the pitch P is too high for any of the layers, then first order diffraction efficiency decreases. If the pitch P is too low for any of the layers, then light is not coupled into the couplers 20, 40. The duty cycle (W/P) of layers 22, 24, and 26 of input coupler 20 and output coupler 40 is defined by the width of the diffraction gratings 30 over the width of the periodic units P (as measured along the lateral axis 60). In some embodiments, the duty cycle of each layer 22, 24, 26 is different from the other layers. In other embodiments, the duty cycle of first and second layers 24 and 26 is substantially equal. The duty cycle of each layer 22, 24, 26 may be in a range from about 0.10 to about 0.95, or about 0.30 to about 0.70, or about 0.40 to about 0.50, according to various examples.

The diffraction gratings 30 may be comprised of one or more of silicon nitride ($Si_3N_4$), niobium pentoxide ($Nb_2O_5$), titanium dioxide ($TiO_2$), tantalum pentoxide ($Ta_2O_5$), hafnium (IV) oxide ($HfO_2$), hatrium dioxide ($ScO_2$), scandium dioxide (SiN), silicon nitride ($SiO_xN$), and aluminum oxygen nitride ($AlO_xN$), according to various embodiments. Therefore, the diffraction gratings 30 may comprise material with a relatively high refractive index (e.g., higher than the refractive index of the fill material), such as 1.5 or higher or in a range from about 1.5 to about 2.0, or from about 1.7 to about 2.0. Because diffraction gratings 30 are comprised of a material with a relatively high refractive index, they are able to efficiently couple light into the couplers 20, 40 and diffract the light within the coupler 20, 30.

The fill material of trenches 38A, 38B, 38C and of fill layers 28, 29 may have a relatively low refractive index (e.g., lower than the refractive index of the diffraction gratings 30). Because trenches 38A, 38B, 38C and fill layers 28, 29 have a low refractive index, light is not refracted by the these components. The fill material of trenches 38A, 38B, 38C and of fill layers 28, 39 may include silicon dioxide ($SiO_2$) glass, or magnesium fluoride ($Mgf_2$) glass, or fused silica glass. In some embodiments, the fill material has a refractive index of less than about 1.5, or in a range from about 1.0 to about 1.3. The fill material may be applied by a spin-on glass method or a coating method (e.g., thin film coating, dip coating, spray coating, printing).

Table 1 below provides the relative dimensions and materials for the exemplary input coupler 20 of FIG. 2.

TABLE 1

| First Examplary Design of Input Coupler | | | | | |
|---|---|---|---|---|---|
| | Thickness (nm) | Width of Diffraction Gratings (nm) | Width of Trenches (nm) | Relative Shift (S) (nm) | Width of Periodic Unit (P) (nm) | Duty Cycle |
| First Layer 22 | 219.9 | 182.16 | 257.4 | S1 = 0 | 440 | 0.41 |
| Second Layer 24 | 493.4 | 209 | 231 | S2 = 210.7 | 440 | 0.48 |
| Third Layer 26 | 399.7 | 209 | 231 | S3 = 53.7 | 440 | 0.48 |
| First Fill Layer 28 | 158.6 | | | | | |
| Second Fill Layer 29 | 123.1 | | | | | |

| | Materials | Refractive Index |
|---|---|---|
| Diffraction Gratings | $Si_3N_4$ | 2.0 |
| First and Second Fill Layers and Trenches | $SiO_2$ Glass | 1.17 |
| Light Guide | Glass | 1.51 |

In the exemplary example of FIG. 2, the periodic unit P for each of the layers 22, 24 and 26 is 440 nm even though the layers 22, 24, and 26 have different grating widths. The duty cycle is 0.48 for each of the second and third layers 24 and 26 and is 0.41 for the first layer 22. The relative shift distances S2 and S3 are set so as to align the diffraction gratings 30 along the slanted line 34 such that the slanted angle θ is 26.29° in the embodiment of FIG. 2. Additionally, the propagation angle α of the light exiting the input coupler 20 of FIG. 2 is 52.57°. When used with a wavelength of 532 nm, the input coupler 20 of FIG. 2 has a transmission efficiency of about 99.56%.

Table 2 below provides the relative dimensions and materials for the exemplary input coupler 20 of FIG. 3.

TABLE 2

Second Examplary Design of Input Coupler

|  | Thickness (nm) | Width of Diffraction Gratings (nm) | Width of Trenches (nm) | Relative Shift (S) (nm) | Width of Periodic Unit (P) (nm) | Duty Cycle |
|---|---|---|---|---|---|---|
| First Layer 22 | 335.6 | 280 | 120 | S1 = 0 | 400 | 0.48 |
| Second Layer 24 | 288.6 | 190 | 210 | S2 = 81.1 | 400 | 0.48 |
| Third Layer 26 | 355.4 | 190 | 210 | S3 = 68.2 | 400 | 0.70 |
| First Fill Layer 28 | 104.1 |  |  |  |  |  |
| Second Fill Layer 29 | 200.2 |  |  |  |  |  |

| Materials | Refractive Index |
|---|---|
| Diffraction Gratings | $Si_3N_4$ | 2.0 |
| First and Second Fill Layers and Trenches | $SiO_2$ Glass | 1.17 |
| Light Guide | Glass | 1.7 |

In the exemplary example of FIG. 3, the periodic unit P for each of the layers 22, 24 and 26 is 400 nm even though the layers 22, 24, 26 have different grating widths. The duty cycle is 0.48 for each of the second and third layers 24 and 26 and is 0.70 for the first layer 22. The relative shift distances S2 and S3 are set so as to align the diffraction gratings 30 along the slanted line 34 such that the slanted angle θ is 25.74° in the embodiment of FIG. 3 Additionally, the propagation α of the light exiting the input coupler 20 of FIG. 3 is 51.47°. When used with a wavelength of 532 nm, the input couple 20 of FIG. 3 has a transmission efficiency of about 99.60%.

Table 3 below provides the relative dimensions and materials for the exemplary output coupler 40 of FIG. 4.

TABLE 3

Examplary Design of Output Coupler

|  | Thickness (nm) | Width of Diffraction Gratings (nm) | Width of Trenches (nm) | Relative Shift (S) (nm) | Width of Periodic Unit (P) (nm) | Duty Cycle |
|---|---|---|---|---|---|---|
| First Layer 22 | 114.3 | 180.4 | 219.6 | S1 = 0 | 400 | 0.45 |
| Second Layer 24 | 290.1 | 190 | 210 | S2 = 14.3 | 400 | 0.48 |
| Third Layer 26 | 225.1 | 190 | 210 | S3 = 196.7 | 400 | 0.48 |
| First Fill Layer 28 | 180.5 |  |  |  |  |  |
| Second Fill Layer 29 | 220.2 |  |  |  |  |  |

| Materials | Refractive Index |
|---|---|
| Diffraction Gratings | $Si_3N_4$ | 2.0 |
| First and Second Fill Layers and Trenches | $SiO_2$ Glass | 1.17 |
| Light Guide | Glass | 1.7 |

In the exemplary embodiment of FIG. 4, the periodic unit P for each of the layers 22, 24 and 26 is 400 nm even though the layers 22, 24, 26 have different grating widths. The duty cycle is 0.48 for each of the second and third layers 22 and 26 and is 0.45 for the first layer 22. The relative shift distances S1 and S3 are set so as to align the diffraction gratings 30 along the slanted line 34 such that the slanted angle θ is 25.75° in the embodiment of FIG. 4. Additionally, the propagation angle α of the light exiting the output coupler 40 of FIG. 4 is 51.5°. When used with a wavelength of 532 nm, the output coupler 40 of FIG. 4 has a transmission efficiency of 99.80%.

Figure 5A:
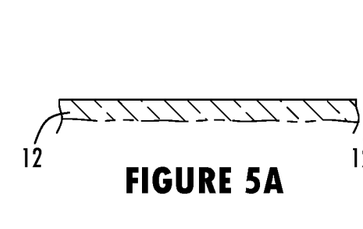
FIG. 5A is a schematic view of a light guide used in a method of fabricating an optical coupler device, according to a first step.
Figure 5B:
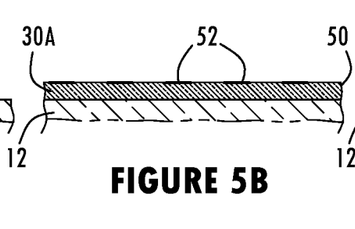
FIG. 5B is a schematic view illustrating a step of depositing a first layer of grating material on the light guide and applying a photoresist and mask.
Figure 5C:
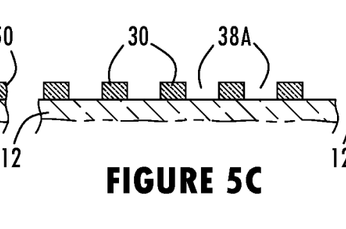
FIG. 5C is a schematic view illustrating a step of forming a first layer of first diffraction gratings by developing and etching first trenches.
Figure 5D:
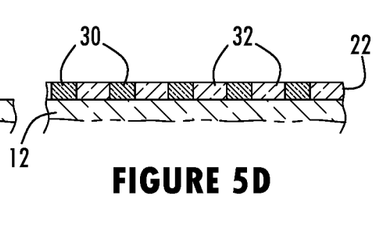
FIG. 5D is a schematic view illustrating a step of depositing a fill material in the first trenches between the first diffraction gratings.

The optical couplers 20, 40 can each be fabricated using semiconductor mask technology. One example of a method of fabricating the optical couplers 20, 40 is illustrated in FIGS. 5A-5L showing various step of the fabrication process. The light guide 12, which may be made of glass, is illustrated in FIG. 5A having a flat top surface as a starting substrate in an initial step of the process. A high index grating layer 30A is fabricated on the top surface of the light guide 12. In addition, a layer of photoresist material 50 may be provided on top of the grating layer 30A, and masking portions 52 with a desired pattern may be provided on top of the photoresist material 50. Ultraviolet (UV) light is then applied to etch the structure to remove portions of the grating layer 30A where the photoresist 50 is exposed. Next the etched material is washed away so as to expose first trenches 38A between diffraction gratings 30. Next, in the step shown in FIG. 5D, a fill material having a low refractive index is disposed within the first trenches 38A to complete the formation of the first layer 22. The top surface of the first layer 22 may then be polished to provide a smooth planar surface.

Figure 5E:
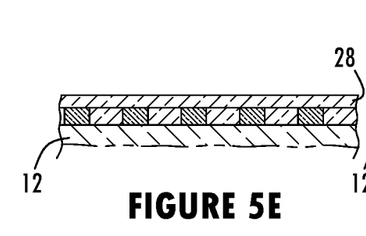
FIG. 5E is a schematic view illustrating a step of further depositing a first film layer of the fill material on top of the first layer of diffraction gratings.
Figure 5F:
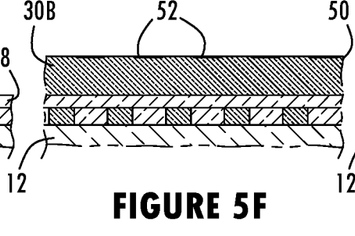
FIG. 5F is a schematic view illustrating a step of depositing a second layer of grating material on top of the first film layer and applying a photoresist and mask.
Figure 5G:
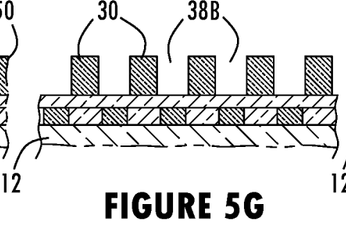
FIG. 5G is a schematic view illustrating a step of forming a second layer of second diffraction gratings by developing and etching second trenches.
Figure 5H:
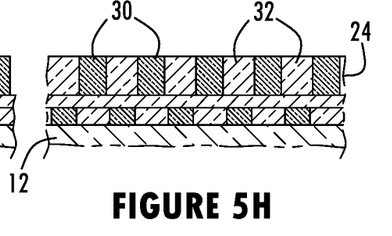
FIG. 5H is a schematic view illustrating a step of depositing a fill material in the second trenches between the second diffraction gratings.

Referring to FIG. 5E, a first layer of fill material 28 having a low refractive index is formed on top of the first layer 22. Next, in FIG. 5F, a high index grating layer 30B is formed on top of the first layer of fill material 28, and a layer of photoresist material 50 and masking portions 52 with a desired pattern are disposed on top thereof. UV light is then applied to the top layer to etch the structure to remove portions of the grating layer 30B where the photoresist 50 is exposed. Next the etched material is washed away so as to expose second trenches 38B between diffraction gratings 30, as shown in FIG. 5G. The fill material 32 having a low refractive index is then disposed within the second trenches 38B, as shown in FIG. 5H, to complete the second layer 24. The top surface of the second layer 24 may then be polished to provide a smooth planar surface.

Figure 5I:
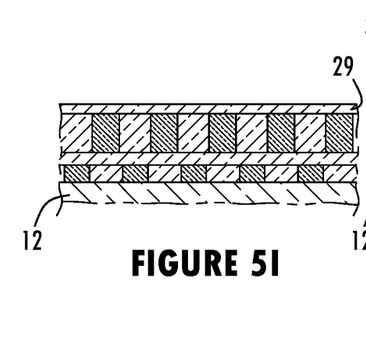
FIG. 5I is a schematic view illustrating a step of further depositing the fill material on top of the second layer of diffraction gratings.
Figure 5J:
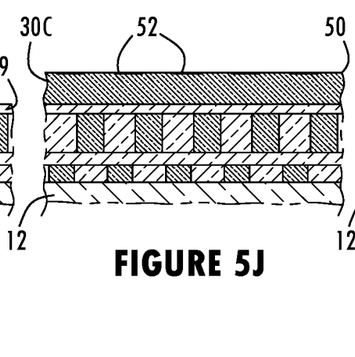
FIG. 5J is a schematic view illustrating a step of depositing a third layer of grating material on top of the second film layer and applying a photoresist and mask.
Figure 5K:
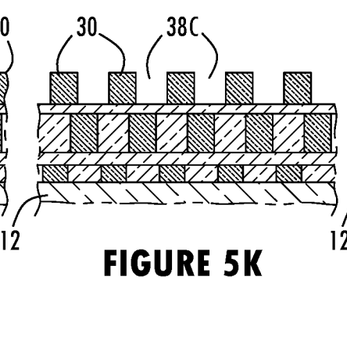
FIG. 5K is a schematic view illustrating a step of forming a third layer of third diffraction gratings by developing and etching third trenches.
Figure 5L:
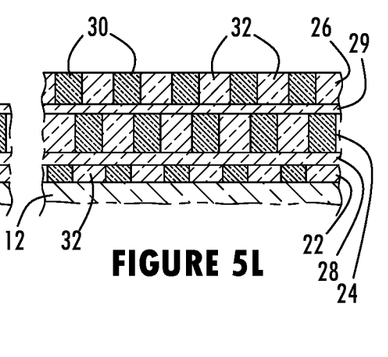
FIG. 5L is a schematic view illustrating a step of depositing a fill material in the third trenches between the third diffraction gratings.

Referring to FIG. 5I, a second layer 29 of fill material having a low refractive index is formed on top of the second layer 24. A high index grating layer 30C is then disposed on top of the second layer 29 of fill material, and photoresist 50 and masking portions 52 with a desired pattern are applied on top thereof, as shown in FIG. 5I. UV light is then applied to the photoresist to etch the structure to remove portions of the grating layer 30C where the photoresist 50 is exposed. Next the etched material is washed away so as to expose third trenches 38C between diffraction gratings 30, as shown in FIG. 5K. Finally, in FIG. 5L, the third trenches 38C are filled with fill material having a low refractive index to complete fabrication of the third layer 26. The top surface of the third layer 26 may then be polished to provide a smooth planar surface.

The optical couplers disclosed herein advantageously can be employed to efficiently couple light into a light guide when configured as an input coupler and can be employed to efficiently couple light out of the light guide when configured as an output coupler. The optical coupler of the embodiments disclosed herein is relatively thin and can be easily fabricated using semiconductor mask technology.

The described embodiments are preferred and/or illustrated, but are not limiting. Various modifications are considered within the purview and scope of the appended claims.

What is claimed is:

1. An optical coupler device for coupling light with a light guide, comprising:
a first layer comprising a plurality of first diffraction gratings spaced apart via first trenches, the first diffraction gratings and the first trenches forming first periodic units;
a second layer comprising a plurality of second diffraction gratings spaced apart via second trenches, the second diffraction gratings and the second trenches forming second periodic units; and
a first fill layer disposed between the first layer and the second layer, the first fill layer having a thickness from about 100 nm to about 260 nm,
wherein the second periodic units are offset in a lateral axis of the optical coupler device relative to the first periodic units by a relative shift distance S2 that is in a range from about 10 nm to about 600 nm.

2. The optical coupler device of claim 1, wherein a width of the first diffraction gratings is different from a width of the second diffraction gratings.

3. The optical coupler device of claim 1, where a thickness of the first diffraction gratings is different from a thickness of the second diffraction gratings.

4. The optical coupler device of claim 1, wherein a width of the first periodic unit is substantially equal to a width of the second period unit.

5. The optical coupler device of claim 1, wherein the relative shift distance S2 is in a range from about 100 nm to about 400 nm.

6. The optical coupler device of claim 1, wherein a material of the first diffraction gratings and of the second diffraction gratings has a refractive index in a range from about 1.5 to about 2.0.

7. The optical coupler device of claim 6, wherein the material of the first diffraction gratings and the second diffraction gratings has a refractive index in a range from about 1.7 to about 2.0.

8. The optical coupler device of claim 1, wherein a material of the first trenches and of the second trenches has a refractive index of less than about 1.5.

9. The optical coupler device of claim 8, wherein the material of the first trenches and the second trenches has a refractive index in a range from about 1.0 to about 1.3.

10. The optical coupler device of claim 1, wherein a material of the first and second trenches is the same as a material of the first fill layer.

11. The optical coupler device of claim 1, further comprising a third layer comprising a plurality of third diffraction gratings spaced apart via third trenches, the third diffraction gratings and the third trenches forming third periodic units, wherein the third periodic units are offset in a lateral axis of the optical coupler device relative to the first periodic units by a relative shift distance S3.

12. The optical coupler device of claim 11, further comprising a second fill layer disposed between the second layer and the third layer.

13. The optical coupler device of claim 12, wherein a material of the first, second, and third trenches is the same as a material of the second fill layer.

14. The optical coupler device of claim 1, wherein the optical coupler device is an input coupler configured to couple light into the light guide.

15. The optical coupler device of claim 1, wherein the optical coupler device is an output coupler configured to couple light out of the light guide.

16. The optical coupler device of claim 1, wherein the first diffraction gratings and the second diffraction gratings comprise one or more of one or more of silicon nitride ($Si_3N_4$), niobium pentoxide ($Nb_2O_5$), titanium dioxide ($TiO_2$), tantalum pentoxide ($Ta_2O_5$), hafnium (IV) oxide (HfO2), hatrium dioxide ($ScO_2$), scandium dioxide (SiN), silicon nitride ($SiO_xN$), and aluminum oxygen nitride ($AlO_xN$).

17. The optical coupler device of claim 1, wherein the first trenches and the second trenches comprise one or more of silicon dioxide ($SiO_2$) glass, magnesium fluoride ($Mgf_2$) glass, or fused silica glass.

18. An optical device comprising a light guide and the optical coupler device of claim 1.

* * * * *

UNITED STATES PATENT AND TRADEMARK OFFICE
CERTIFICATE OF CORRECTION

PATENT NO. : 11,650,372 B2
APPLICATION NO. : 17/408692
DATED : May 16, 2023
INVENTOR(S) : Horst Herbert Anton Schreiber et al.

Page 1 of 1

It is certified that error appears in the above-identified patent and that said Letters Patent is hereby corrected as shown below:

In the Claims

In Column 14, Line 53, in Claim 16, delete "one or more of one or more of" and insert -- one or more of --.

Signed and Sealed this
Ninth Day of January, 2024

Katherine Kelly Vidal
*Director of the United States Patent and Trademark Office*